Figure 1:
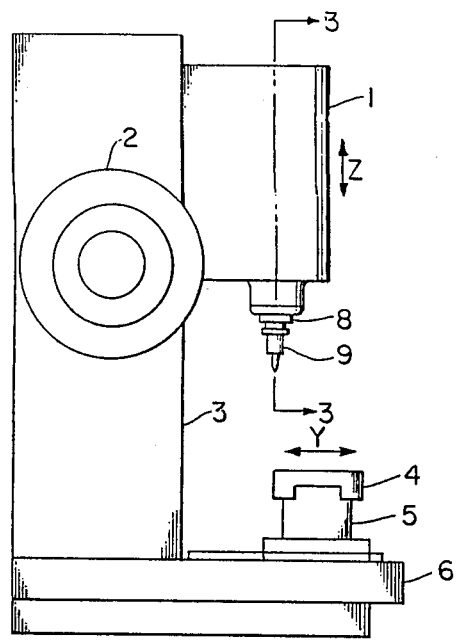

United States Patent [19]

Lehmkuhl

[11] Patent Number: 4,784,539

[45] Date of Patent: Nov. 15, 1988

[54] TOOL COMMUNICATIONS METHOD

[75] Inventor: Robert A. Lehmkuhl, Cincinnati, Ohio

[73] Assignee: Manuflex Corporation, Cincinnati, Ohio

[21] Appl. No.: 195,666

[22] Filed: May 18, 1988

Related U.S. Application Data

[63] Continuation-in-part of Ser. No. 050,941, May 18, 1987.

[51] Int. Cl.⁴ .......................... B23C 9/00; B23B 49/00
[52] U.S. Cl. ..................................... 409/80; 33/505; 33/558; 364/571.01; 408/1 R; 409/132; 409/135
[58] Field of Search ................. 409/131, 132, 80, 127, 409/187, 194, 196, 218, 135, 241; 408/3, 6, 10, 11, 12, 13, 1; 33/558, 559, 561, 556, 505, 201, 185 R; 364/560, 562, 571; 318/569

[56] References Cited

U.S. PATENT DOCUMENTS

| | | | |
|---|---|---|---|
| 3,587,360 | 6/1971 | Oxenham | 409/80 |
| 3,636,814 | 1/1972 | Esch | 409/80 |
| 4,326,824 | 4/1982 | Lasermann et al. | 409/132 |
| 4,413,422 | 11/1983 | Kitamura | 33/558 |
| 4,425,061 | 1/1984 | Kindl et al. | 409/218 |
| 4,590,580 | 5/1986 | Takezawa et al. | 364/571 |
| 4,750,272 | 6/1988 | Caddell | 33/558 X |

FOREIGN PATENT DOCUMENTS

| | | | |
|---|---|---|---|
| 46032 | 2/1982 | European Pat. Off. | 318/569 |
| 3009393 | 10/1980 | Fed. Rep. of Germany | 33/505 |
| 144957 | 11/1980 | German Democratic Rep. | 33/505 |
| 0044206 | 3/1985 | Japan | 409/241 |

*Primary Examiner*—William R. Briggs
*Attorney, Agent, or Firm*—Edward J. Utz

[57] ABSTRACT

An intelligent Tool System used with Computer Numerical Controlled machining centers consisting of a method of establishing tool presence and type of tooling device and a method of eliminating any error due to thermal growth.

The spindle mechanism provides CNC Communicating and Operating means with spindle mounted devices for establishing tool presence and type of tooling for eliminating error due to thermal growth and for determining the function of tooling devices such as telescoping tool holders for determining work surface location with random length tools and for sensing tool condition; automatic boring tools for high precision boring and contouring; probing devices for work surface location, measurement and definition; combination boring and probing tools for boring and measuring a hole without removing the tool from the spindle.

6 Claims, 12 Drawing Sheets

Fig. 15
Fig. 16
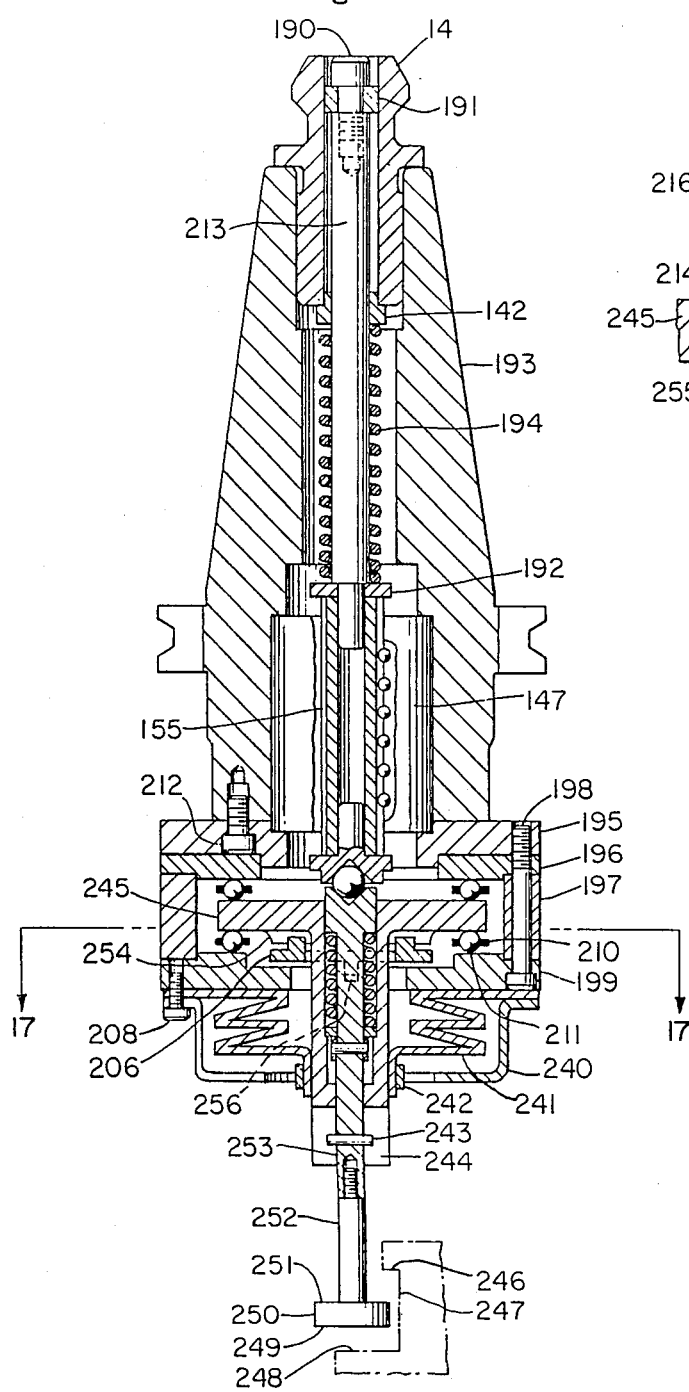
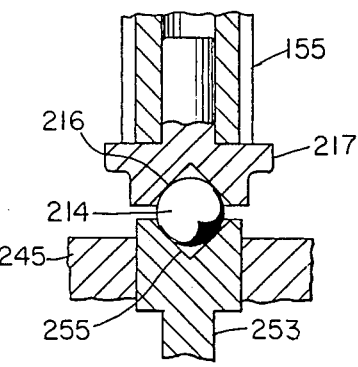

TOOL COMMUNICATIONS METHOD

This application is a continuation-in-part of an application filed May 18, 1987, Ser. No. 50,941.

In machining centers that are used in an operator attended environment or in the case when such machining centers are part of a work cell or Flexible Manufacturing System, it is desirable to have tooling systems that can communicate with and/or be controlled by the machine system Computer Numerical Control.

Therefore the principle object of my invention is to provide a method of establishing tool pressure and a type of tooling device and a method of eliminating error due to thermal growth.

Another object of my invention is to provide a means of incorporating through the machining center spindle a means of controlling the position and force of a tool control rod by the machine CNC.

Previous to my invention it was necessary to reference tools to a position known as the "R" plane, therefore, another object of my invention is to eliminate the necessity for the reference plane, thereby reducing cycle time.

Still another object of my invention is to eliminate in programming of the workpiece the "R" plane dimension, since the "R" plane is determined by the surface sensing feature.

Another object of my invention is to verify the presence of the correct type of tool in the spindle by utilizing the encoder or transducer position and by controlling the force on the tool control rod.

Another object of my invention is to eliminate any error in spindle encoder feedback due to thermal growth by offsetting control or using incremental control after tool insertion into spindle.

Still another object of my invention is to provide spindle mounted boring tools for machining centers that are capable of being automatically adjusted without operator intervention.

Another object of my invention is to control the boring tool adjustment by means of a tool control rod in the machining center spindle.

Another object of my invention is to provide a method of adjusting an automatic boring tool that can be configured for sufficient adjustment range such that it can be used for taper boring or thread chasing when controlled simultaneously with the Z axis of the machining center.

Another object of my invention is to provide cutting tool stability by preloading all operating mechanisms in the boring tool operating body.

Another object of invention is to provide a variety of spindle mounted probing devices having the means to operate the position sensitive encoder or transducer for sensing the location of objects while being moved relative to those objects in the plus or minus Z direction or in the X or Y direction.

Another object of my invention is to provide a spindle mounted probing system that is able to inspect the contour of the work surface parallel to the spindle center line.

Another object of my invention is to provide a spindle mounted probing system capable of defining the contour of a work surface in a plane perpendicular to the spindle center line.

Another object of my invention is to have the probe stylus constantly parallel to the spindle center and thus avoid any negative affect or probing accuracy due to stylus length.

Another object of my invention is to provide a mechanical probe stylus mounting device that has uniform triggering travels regardless of stylus deflection direction.

Still another object of my invention is to provide a probing system capable of sending a trigger signal to a position detection circuit in the machine CNC the instant the probe contacts the work surface.

Another object of my invention is to provide a probing system capable of controlling the machine axis traverse rate in order to decelerate from a rapid traverse rate to an absolute position and capable of tracking the deceleration distance of the machine axis after the stylus contacts the work surface.

SURFACE SENSING TOOL

In CNC machining centers, non-telescoping tool holders are used in conjuncion with an "R" plane setting and thereafter cycling to the "R" plane setting, and measuring the distance from the tool point to the work surface and manually adjusting the tool length for each tool used. Alternatively, manually preset tools are employed. Another method is to utilize spindle and table probe cycles which are time consuming and expensive.

In previous telescoping adapters as described in U.S. Pat. No. 4,579,487 dated Apr. 1, 1986 it was necessary to use an integral mounted torque arm to work in conjunction with a machine mounted transducer.

To overcome these economic disadvantages, I have provided a method of telescoping tool holders for milling, drilling and tapping which consists of an adapter having a tool body arranged to be retained in the taper of the machine spindle. A springloaded sliding tool holder is fitted to the bore of the tool body, driven by a sliding key and retained by stop blocks. A tool actuating rod is secured to the sliding tool holder and extends through the center of the tool body and retention knob that is used to operate with the power tool locks in standard machining center spindles. The tool actuating rod establishes contact with a spindle control rod that operates through the center of the spindle and power tool lock mechanism.

DRILLING

A variety of tool adapters can be used to accommodate the type of machining required for drilling operations with a machining center, a tool adapter arranged with a collet type tool holder is generally used. The collet assembly is mounted in the sliding tool holder.

In the drilling operation the spindle tool adapter is moved to the work surface at a rapid traverse rate by the Z axis until the drill contacts the work surface. At this point, the drill stops advancing, but the spindle axis continues to move toward the work surface. This causes the tool holder to telescope into the tool body which in turn causes the tool actuating rod to move the spindle control rod and sliding element relative to the spindle gage line. This telescoping motion is able to overcome the controlled low force on the servo motor and displace the encoder. The encoder displacement as measured form the tool verification point is processed by the machine CNC which decelerates the Z axis in a predetermined distance to zero velocity. The distance traveled is the same as the travel of the telescoping tool holder, seating it solidly in the telescoping tool holder, seating it solidly in the adapter body. When the predetermined transducer position is reached the machine CNC will offset the Z axis at this point and will immediately feed the drill or Z axis at a programmed feed rate to a programmed depth from the offset point which is the work surface. At the programmed depth, the spindle will retract to a point that brings the tool clear of the work surface if another hole is to be drilled or the spindle will retract to a tool change position if another tool is required.

If the drill breaks before the programmed depth is reached the spring-loaded tool holder will unseat in the adapter body. This action will cause the tool actuating rod to move with the tool holder, in turn the low force on the linear servo motor will displace the spindle control rod causing the sliding element to move and the transducer to be displaced from its predetermined position, signaling the machine CNC that a malfunction has occurred.

In advanced CNC logic, the initial surfaces location position can be put in memory. This information can be used to determine if a drill was broken on a previous operation but went undetected. If the drill was broken, the surface location position of the new cycle would be different than that with a full length drill. This difference in position will signal the machine CNC that a malfunction has occurred.

If broken tool detection is not required, then this same logic and tool adapter action can be used to sense when a drill has broken through the workpiece thickness. This may be the case when using larger diameter drills for drilling through holes from irregular surfaces of large castings or weldments.

BORING

In machine tools—manually adjusted boring tools are normally used. These are usually preset or set at the machine by the operator by using dial bore gages or other measuring devices. If the hole diameter size exceeds the tolerance band, then another manual setting procedure is employed. In some cases when automatically adjustable tools are used, it is necessary to adjust them in increments by using external devices during a cycle interruption procedure. Other automatically adjustable boring bars do not have sufficient range of adjustment to machine various contours, or their actuating device is extremely large and expensive. Some of the automatic adjustable tools can not be handled by the machine automatic tool changer.

In previous automatic boring tools as described in U.S. Pat. No. 4,612,831, dated Sept. 23, 1986 it was necessary to have an integral mounted torque arm to work in conjunction with a machine mounted servo driven actuating unit.

To overcome these performance and economic disadvantages I have provided a method of controlling an automatic boring tool wherein a main operating body is fitted with a retention knob and arranged to be retained in the taper of the machine spindle by means of a power tool lock.

The method is described as follows: a spring preloads the operating mechanism of a pivot mounted boring bar which boring bar is adjusted by means of a cam bar that is integral with a portion of the boring bar that is opposite the cutting tool. Thereafter the pivot point is located between the cam bar and cutting tool and the position of the cam bar about the pivot point is established by the position of a linear cam slidably mounted in the main operating body. The linear cam is secured to and held in a fully retracted position by a spring loaded tool actuating rod passing through the main operating body and retention knob. In operation the position of the actuating rod and linear cam is established by the position of the spindle control rod under the control of the machine CNC as previously described. The spring force on the tool actuating rods acts in the opposite direction of the force from the spindle control rod, therefore contact between the two rods are maintained under all operating conditions. As the linear cam changes position the cam bar motion about the boring bar pivot causes the boring bar to tilt to a controlled angle. By this method the location of the boring tool is moved or adjusted to decrease the size of the hole being bored. Under operating conditions the current to the linear servo motor controlling the position of the spindle control rod is monitored to verify that contact between the spindle control rod and the spring loaded tool actuating rod is maintained.

OPERATION

The main operating body of the boring tool is fitted with a slidably mounted linear cam having a very gradual cam surface. The angle of the cam surface versus the "length ration" of the pivot mounted boring bar determines the accuracy and increment of adjustment that can be made during boring. The "length ratio" of the bar is the distance from the cam bar to the pivot point divided by the distance from the pivot point to the tool tip. For precision boring, a selected cam angle may provide for 0.00001" tool tip motion for each 0.0001" motion of the servo controlled spindle control rod, and since the resolution for servo controlled devices is normally 0.0001" or less a very fine adjustment can be made.

The selected bar will not only have the proper "length ratio" but also have the correct length and diameter to accomplish the desired boring operation. It should be noted that this design allows for boring holes over a large range of diameters and lengths.

After the selection and assembly of the correct linear cam, boring bar and tool, the linear cam is positioned in its fully retracted position by the spring loaded tool actuating rod. This position provides the smallest diameter the boring tool will machine. At this point the tool is usually preset with gages to the mean of the tolerance permitted. The tool is then either manually loaded or inserted by the machine automatic tool changer into the machine spindle. Prior to this spindle control rod is fully retracted. After the boring tool is secured in the spindle taper by the spindle power tool lock acting on the tool retention knob, the control rod is advanced by the servo motor with a reduced current level until it contacts the tool actuating rod. The position of the encoder is processed by the machine CNC, to verify tool presence and type of tool in spindle and to establish an "0" set point.

During operation the hole is bored and subsequently inspected by either a machine mounted probe or an off the machine inspection instrument. In the event the hole diameter falls below tolerance an adjustment is made by the servo controlled spindle control rod moving the tool actuating rod and linear cam which causes the preloaded cam bar acting on the cam surface to pivot the boring bar. The amount of adjustment is the result of probe or inspection instrument information being processed by the machine CNC. This process can be repeated at programmed intervals until the production is complete.

PROBING

In present probing systems the output of the stylus deflection device is a discreet trigger signal. The amount of stylus pre-travel deflection is directionally sensitive due to the lobing effect of a three point support.

The present probing systems require a dedicated machine mounted inductive receiver, receiving signals from a complex switching arrangement internal to the probe head, or a more complicated probing head having not only a complex switching arrangement, but also other devices using centrifical switches and/or infra-red signals or the like to indicate to a machine mounted receiver that the stylus mechanism has been triggered.

The present probing systems are not capable of sending signals proportional to stylus deflection or controlling the rate of axis deceleration to discreet null position for triggering the machine axis location.

In previous probing devices as described in patent application Ser. No. 001,801 filed Jan. 2, 1987 now U.S. Pat. No. 4,752,166 is was necessary to use an integral mounted torque arm to work in conjunction with a machine mounted transducer unit.

To overcome these and other disadvantages I have provided a probing system arranged to work in conjunction with a common machine mounted encoder or transducer that is actuated by means of a control rod through the center of the spindle.

I provide probing devices consisting of a main support body retained in the taper of the machine spindle. The stylus is retained in a spring loaded operating head supported by an anti-friction slide arrangement mounted to the main support body.

If the probe is to be used only for locating surface perpendicular to the spindle centerline, then the stylus deflection is limited to motion parallel to the spindle centerline.

If the probe is to be used only for locating surface parallel to the centerline of the spindle then the stylus deflection is limited to motion perpendicular to the spindle centerline.

If the probe is to be used for locating surface perpendicular and parallel to the spindle line or angular surface, then the spring load operating head is mounted to permit stylus deflection from any angle.

In all cases the stylus is spring biased to a neutral position. The neutral position establishes the offset point of the encoder after the probing device has been inserted in the spindle taper and secured by the spindle power tool lock. The encoder is offset after the spindle control rod, which had been retracted prior to probe insertion, is advanced by the linear servo motor with a reduced current level until it contacts the actuation rod of the probe device. This position of the encoder is processed by the machine CNC to also verify tool presence and type of tool in the spindle. Each type of tool or probe has its own unique initial position.

The support body of the probing device houses a ball spline bushing retained by an end cap. A center shaft with external splines, ground for a preload fit, slides effortlessly in the ball bushing. The center shaft is secured to a tool actuating rod. A spring or combination of springs determine a positive neutral location of the actuating rod and center shaft assembly. The center shaft either directly or through an antifriction mechanism provides a positive neutral position of the probe stylus.

In a probing device arranged for stylus deflection parallel to the probe centerline, a stylus mounting head is secured to the spring biased center shaft.

During a probing cycle the spindle mounted probing device is moved to the work surface at a rapid traverse rate by the Z axis until the stylus contacts the work surface. At this point the stylus stops advancing, but the spindle axis continues to move toward the work surface. This causes the center shaft and mounting head to telescope into the support body, which in turn causes the tool actuating rod to move the spindle control rod and sliding element relative to the spindle gage line. This telescoping motion is able to overcome the controlled low force on the linear servo motor and displace the encoder.

The encoder displacement will cause a signal to be sent to the machine CNC the instant the probe contacts the work surface. The step function signal produced is used to trigger the probe compatible logic in the CNC and the sequence generally requires an axis reversal motion at a lower feed rate to read the probe system output and position location as the stylus leaves the work surface.

Alternately if the probe sequence uses the proportional signal, then the displacement of the encoder will signal the feed rate control circuit of the CNC to gradually reduce the feed rate to zero to a programmed position of the transducer in a distance necessary for normal deceleration. At the programmed position a trigger signal will be sent to the position detector logic in the CNC. The transducer position is algebraically added to the axis position to determine work surface location.

Another method of using the proportional signal is to have the displacement of the transducer slider signal the feed rate control circuit of the CNC to reduce the feed rate to "0" in a distance necessary for normal deceleration. The CNC will then algebraically add the transducer slider displacement to the machine axis position to determine the exact point the stylus contacted the work surface.

The controlled deceleration permitting zero feed rate produce an accurate work surface locating sequence.

When surface flatness is to be defined the spindle is advanced to toward the workpiece until the stylus contacts the work surface. The spindle is then positioned in relation to the work surface an amount that allows the stylus to be axially displaced a fixed amount from the stylus neutral position. The workpiece is then moved in relation to the spindle in a plane perpendicular to the spindle center line. Any surface deviation from a true flat plane will cause the stylus to move axially causing the transducer slider to be displaced from the previously defined fixed location from the neutral position. The axial movement caused by surface deviation will be read by the CNC from the electronic variable displacement transducer.

If the work surface is contoured and the contour was generated by a three axis machine, then the surface can be inspected in a similar manner. The work surface is defined by using a part program to control the motion of the three axis and reading the deviation by the amount of transducer displacement. Another method would be to move the workpiece in a plane perpendicular to the spindle center line with the spindle fully retracted. At given coordinates of workpiece location the spindle is advanced until the stylus contacts the work surface. The spindle is then retracted a programmed amount sufficient for the stylus to clear the surface and the workpiece is moved to a different coordinate.

Using the method where the deviations are continuously read by the CNC from the transducer output produces a more complete and accurate work surface definition.

In a probing device arranged for stylus deflection perpendicular to the spindle center line, the stylus mounting head assembly is secured to the face of the support body and consist of a stylus mounting head located and supported between two parallel surfaces perpendicular to the spindle center line by means of precision preload antifriction ball bearings. The ball bearings are retained in a spacer ring and since they contact flat surfaces they permit the stylus head to move freely parallel to the mounting surfaces. The stylus head engages an orientation device designed to allow the above motion but prevents the head from rotating thus preventing any deviation in reading errors as the stylus contacts the work surface. The stylus head has a precision 90 degree tapered hole located in the surface opposite the stylus.

A precision ball operates in the tapered hole. A center shaft also has a precision 90 degree tapered hole on one end that also operates on the same ball. The center shaft is supported by a ball bushing. The opposite end of the center shaft is secured to the tool actuating rod. The center shaft and tool actuating rod assembly are spring loaded so the tapered hole on the center shaft operating against the ball opposite the tapered hole in the stylus head will cause the stylus head to seek a neutral position along a plane perpendicular to the stylus center line.

Any deflection of the stylus in this plane will move the stylus head on its antifriction ball mounting causing the ball operating between the tapered holes in the stylus head and the tapered holes in the center shaft to roll along the side of the tapered holes of both members. The resultant side force on the center shaft is supported by the ball busing, therefore, all movements necessary to translate the side force against the stylus to an axial force parallel to the stylus is completely friction free. The resultant axial force will cause the center shaft to move axially along this ball spline shaft and the stylus will remain parallel to the neutral position when deflected along a plane perpendicular to the probe center line.

Another configuration of the probing device is constructed similar to the above, which permits the stylus to move axially in relation to the support body carrying the stylus head. This axial motion is also spring loaded and will cause the stylus to seek a neutral position in three directions. The stylus mounting head is supported in a steep tapered hole when it is in its axially neutral position. The taper is steep enough to give rigid support with no side play, but is self releasing along its center line.

When it is required to locate the upper and lower surfaces of a workpiece in planes perpendicular to the spindle center line, a pair of opposing springs acting against positive locating shoulders are used to establish a neutral position of the stylus mounting head. A stylus configured for contacting either the upper or lower surface is secured to the mounting head.

In the drawings, the same reference numerals are used throughout the several views and refer to the same parts, and the sectional views are taken looking in the direction of the arrows at the ends of the section lines.

Figure 2:
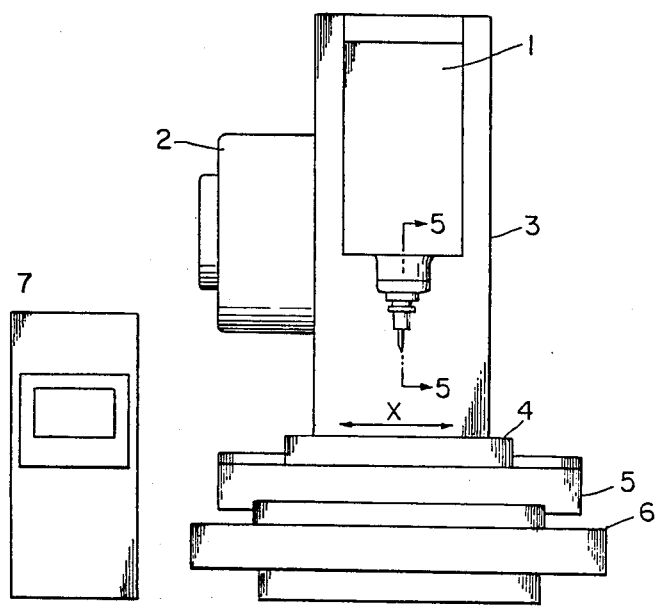
Figure 3:
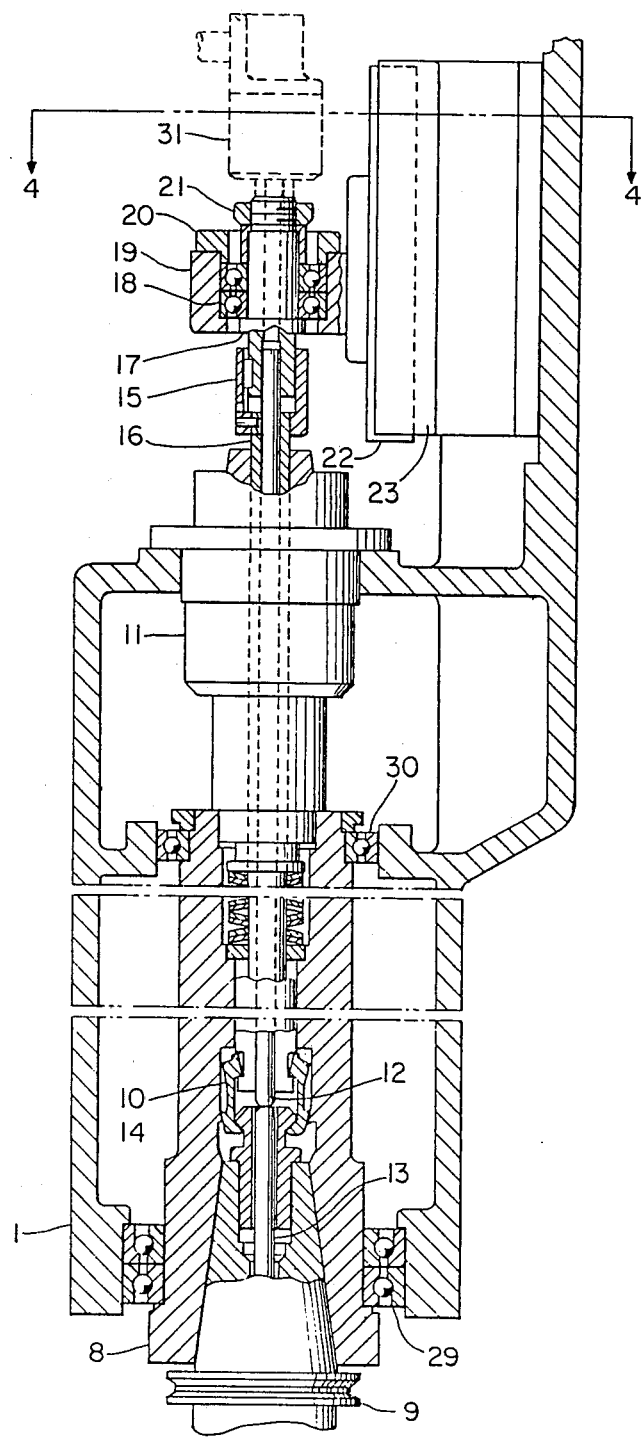
Figure 4:
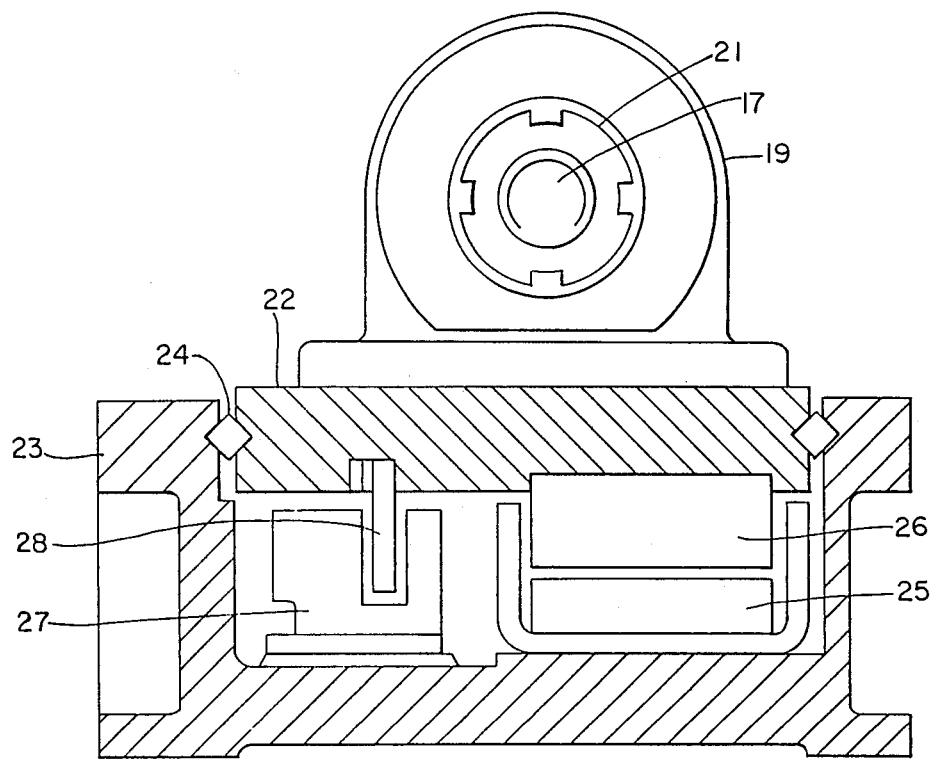
Figure 5:
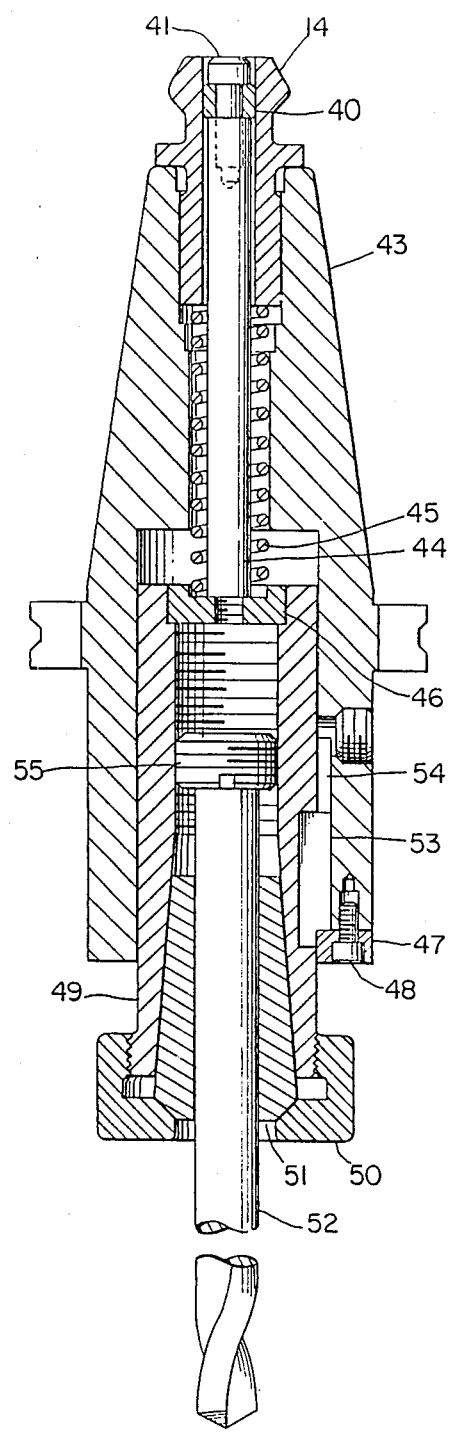
Figure 6:
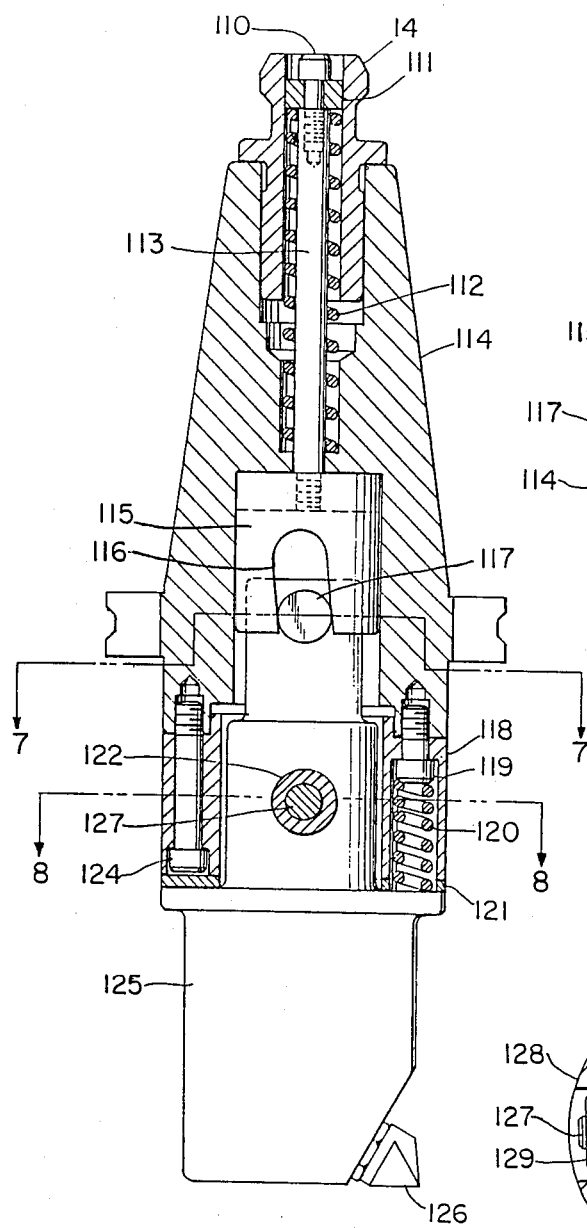
Figure 7:
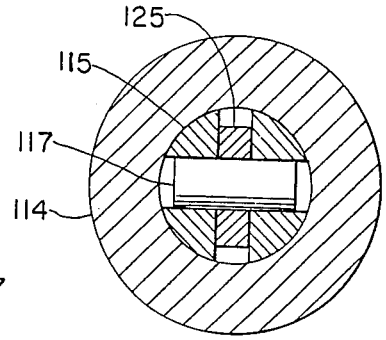
Figure 8:
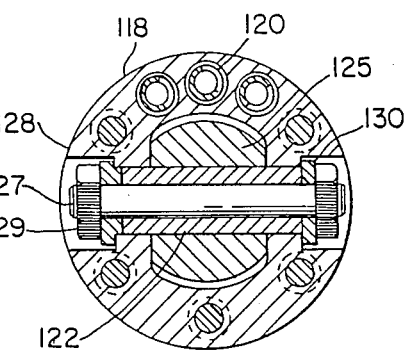
Figure 9:
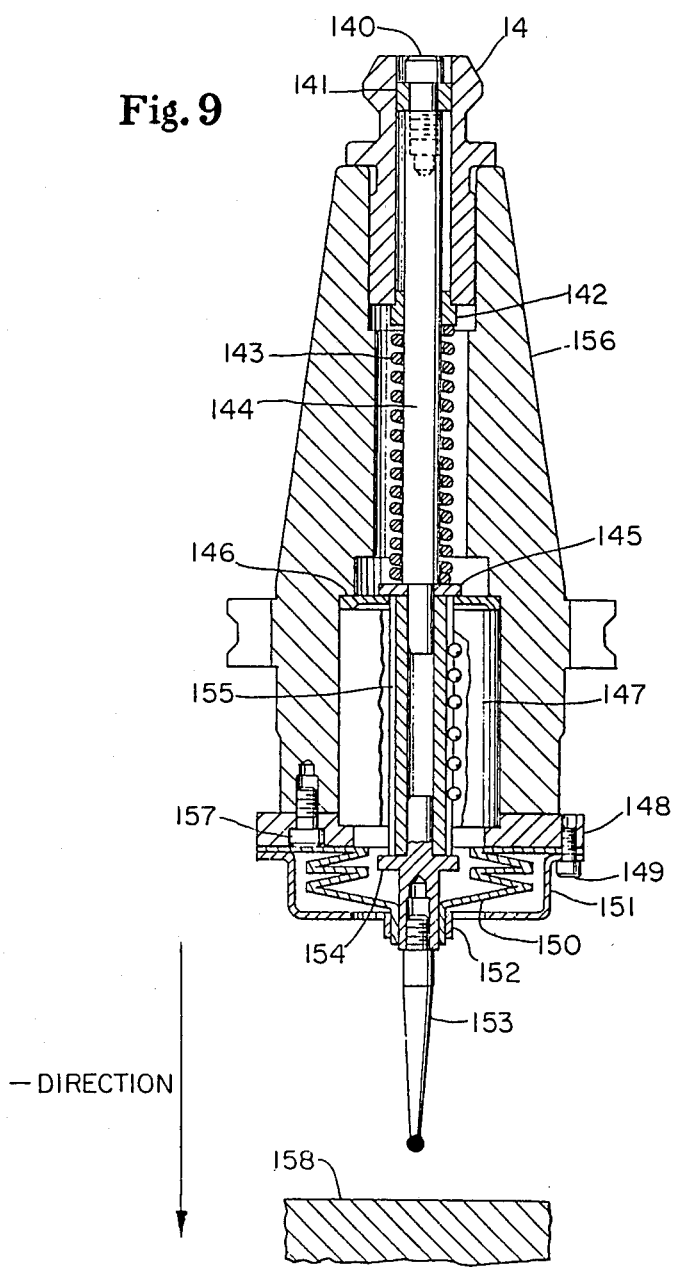
Figure 10:
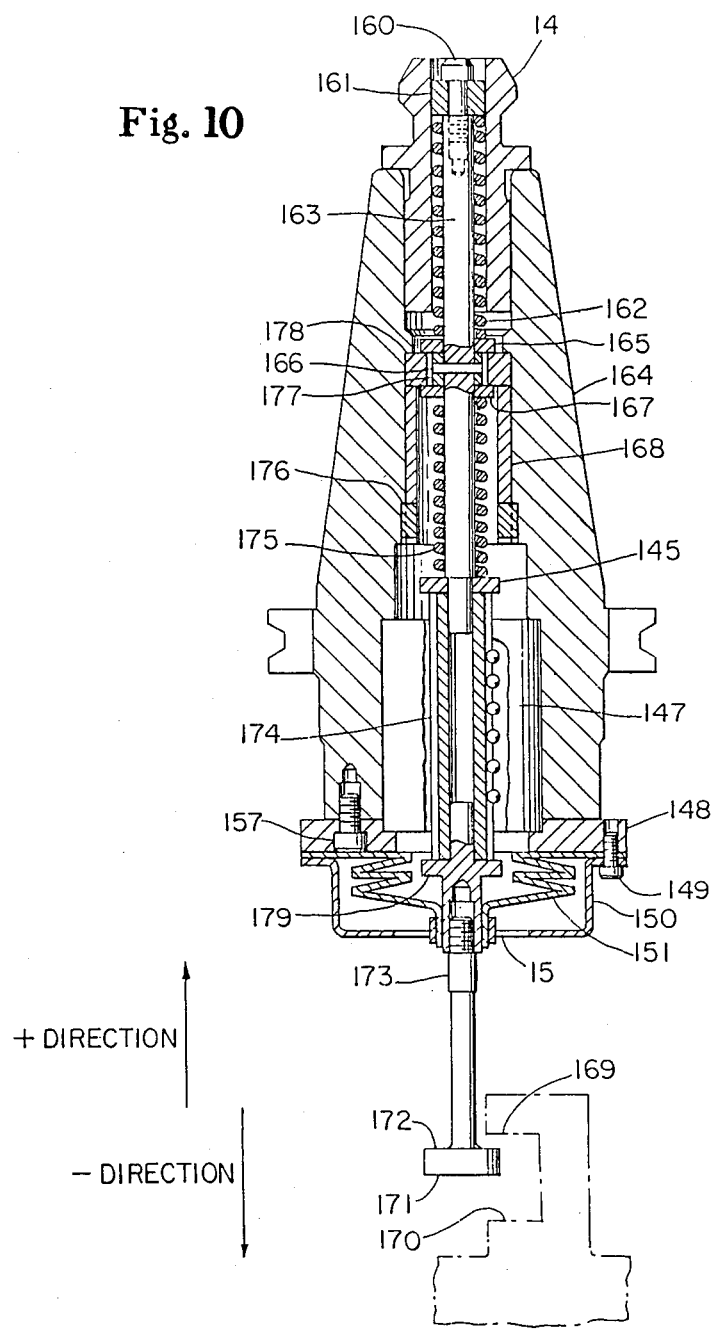
Figure 11:
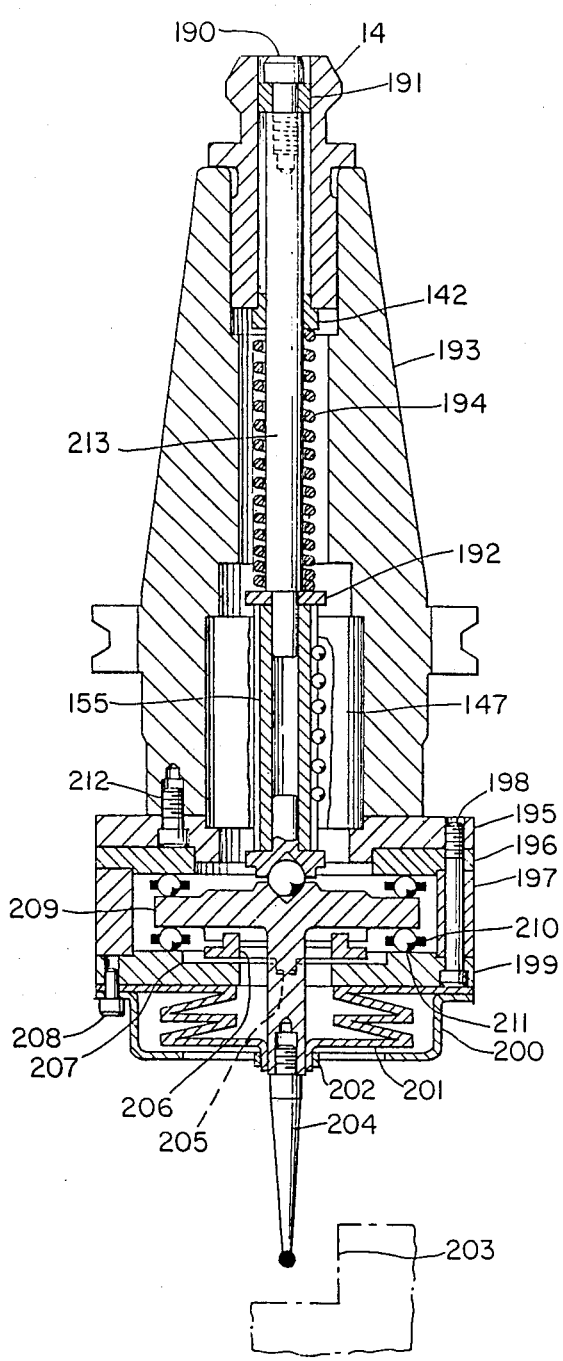
Figure 12:
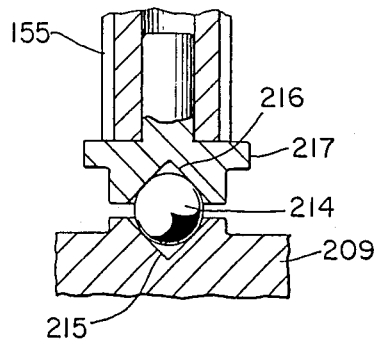
Figures 13, 14:
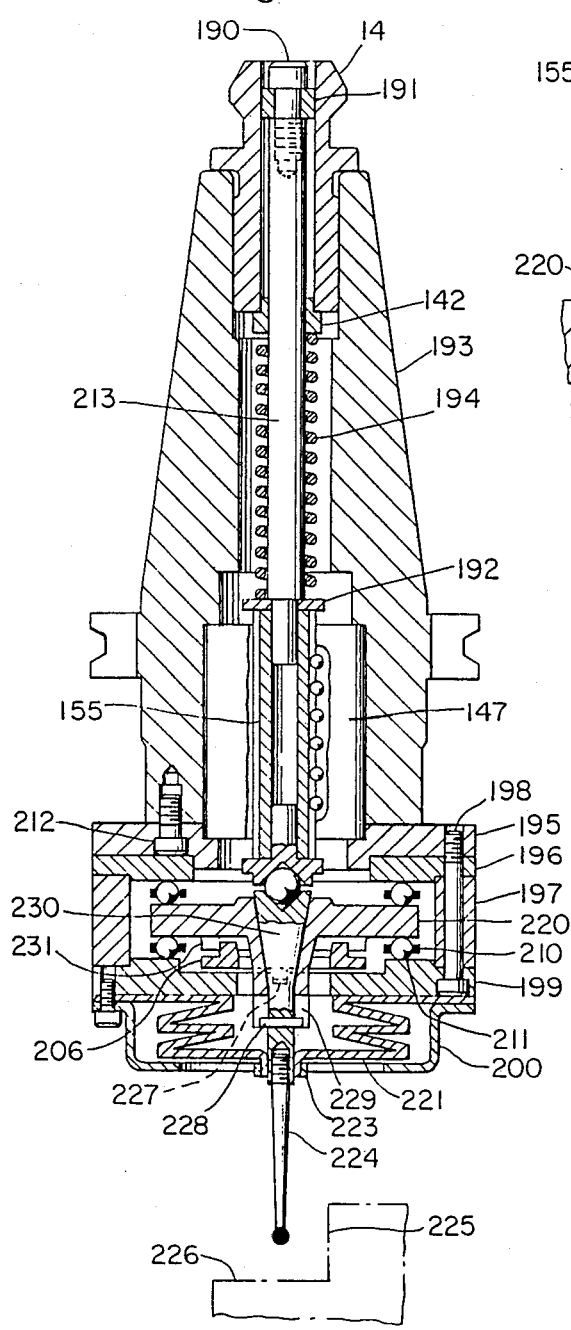
Figure 17:
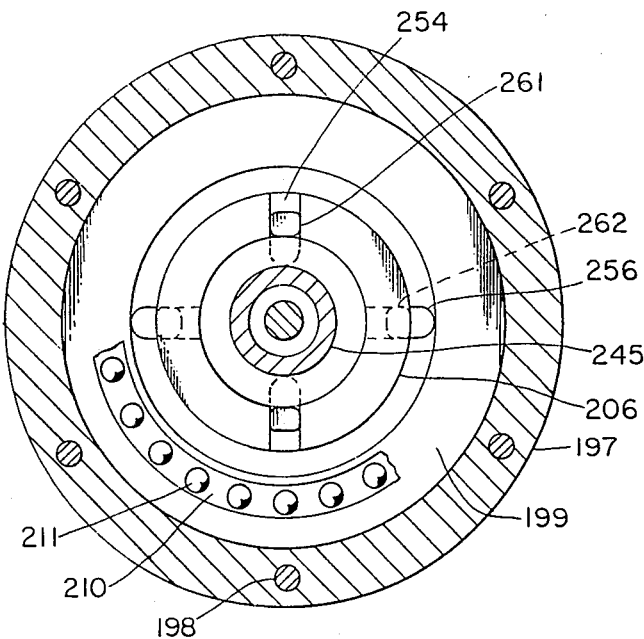
Figure 18:
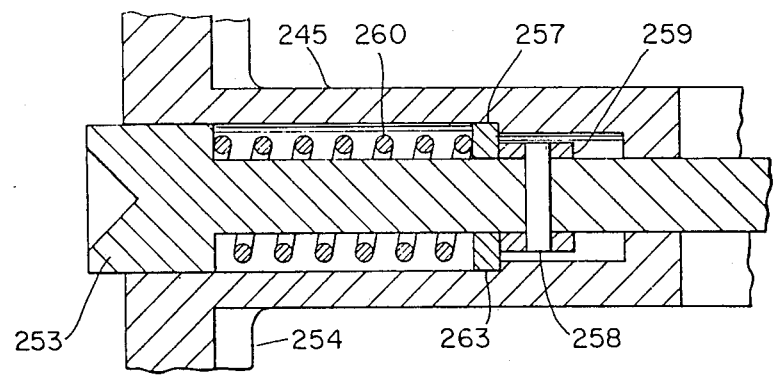
Figures 19, 20:
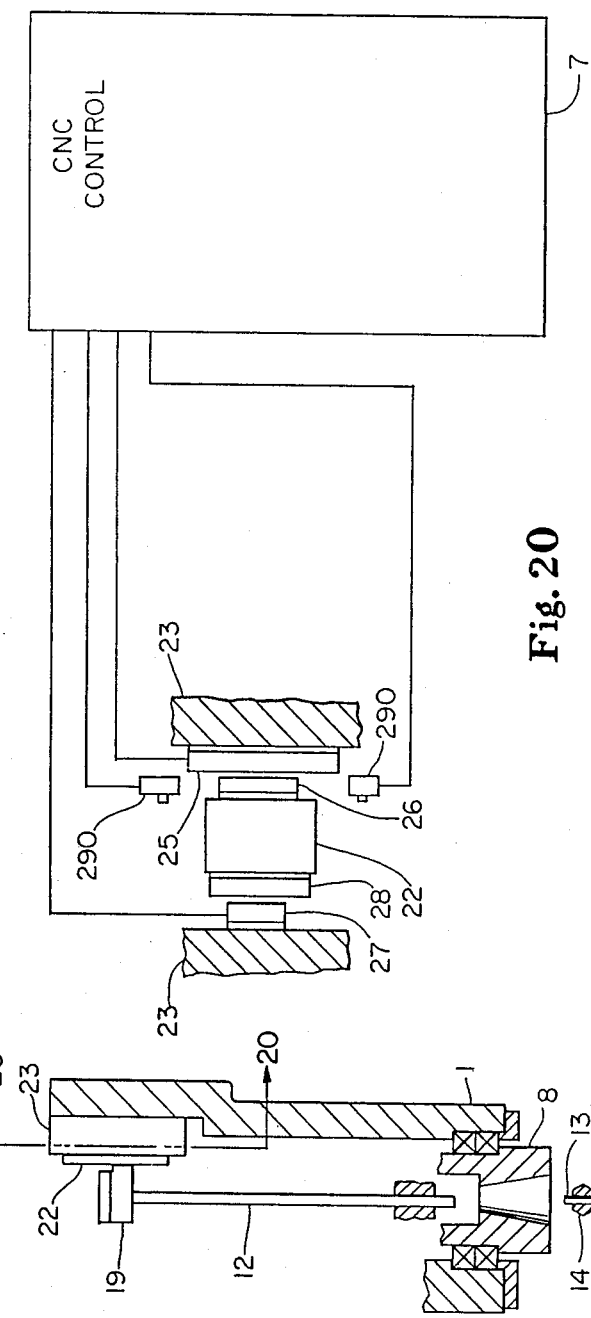

Referring now to the drawings, I show:

FIG. 1 is a side elevation of machining center showing a typical device of my invention inserted in the spindle, FIG. 2 is a front elevation of a machine center, FIG. 3 is a section of the spindle of a machining center arranged with my invention taken along the line 3—3 of FIG. 1, FIG. 4 is a section of the transducer unit of my invention taken along line 4—4 of FIG. 3, FIG. 5 is a section of the tool adapter portion of my invention that is arranged for drilling taken along line 5—5 of FIG. 2, FIG. 6 is a section of the boring tool portion of my invention also taken along line 5—5 of FIG. 2 similar to FIG. 5, FIG. 7 is a section along line 7—7 of FIG. 6, FIG. 8 is a section along line 8—8 of FIG. 6, FIG. 9 is a section of the probing device of my invention arranged for stylus deflection parallel to the probe center line also taken along line 5—5 of FIG. 2 similar to FIG. 5, FIG. 10 is a section of the probing device of my invention arranged for stylus deflection parallel to the probe center line in both the plus and minus direction also taken along line 5—5 of FIG. 2 similar to FIG. 5, FIG. 11 is a section of the probing device of my invention arranged for stylus deflection perpendicular to the probe center line also taken along line 5—5 of FIG. 2 similar to FIG. 5, FIG. 12 is an enlarged section of a portion of FIG. 11 showing ball and tapered hole detail, FIG. 13 is a section of the probing device of my invention arranged for stylus deflection perpendicular and parallel to the probe center line also taken along line 5—5 of FIG. 2 similar to FIG. 5, FIG. 14 is an enlarged section of a portion of FIG. 13 showing ball and tapered hole detail, FIG. 15 is a section of the probing device of my invention arranged for stylus deflection perpendicular to the probe center line and also for stylus deflection parallel to probe center line in both the plus and minus directions also taken along line 5—5 of FIG. 2 similar to FIG. 5, FIG. 16 is an enlarged section of a portion of FIG. 15 showing ball and tapered hole detail, FIG. 17 is a section taken along line 17—17 of FIG. 15, FIG. 18 is an enlarged section of a portion of FIG. 15 showing lower locating spring detail, FIG. 19 is a mechanical schematic of my inventions also taken along line 3—3 of FIG. 1 similar to FIG. 3, FIG. 20 is an electro mechanical schematic of my invention taken along line 20—20 of FIG. 19.

Referring to the drawings I show in FIGS. 1 and 2 a vertical spindle machining center having a base 6 supporting a moving saddle 5. The saddle motion is referred to as the Y axis. The saddle supports the workholding table 4. The table motion is referred to as the X axis. The base 6 also supports the machine column 3. Mounted to column 3 is the automatic tool changer 2. Column 3 also provides a slidable mounting surface for the spindle headstock 1. The vertical motion of the headstock 1 is referred to as the Z axis. Computer numerical 7 control all functions of the machining center.

Referring to FIG. 3 I show a section through the spindle of a typical machining center. Operating through the center of the spindle I show a spindle control rod 12 secured to rotating connecting shaft 17 supported in housing 19 on bearing 18. Bearing cap 20 clamps outer race of bearing 18 in housing 19, jam nut 21 clamps inner races of bearing 18 to connecting shaft 17. Spindle control rod 12 passes through a typical power tool lock mechanism indicated in part by retention collet 10 and operating mechanism 11. Tool lock center shaft 16 is secured to telescoping coupling 15 which allows axial motion to occur between the spindle control rod 12 and center shaft 16 but allows center shaft 16 to rotatably drive connecting shaft 17.

A typical tooling device 9 is supported in the taper of spindle 8 and retained by knob 14 by means of power tool lock retention collet 10. Tool actuating rod 13 is in contact with spindle control rod 12. Referring to FIG. 4 I show housing 19 secured to sliding element 22 which controls the position of and force on control rod 12 (FIG. 3) by linear servo motor (25,26) and transducer (27,28) under the control of computer numerical control 7 (FIG. 2). Sliding element 22 is supported and guided on base 23 by preloaded antifriction bearing and guided on base 23 by preloaded antifriction bearing 24. If coolant through the tool is a requirement then connecting shaft 17 is modified to mount a rotary coolant coupling 31, spindle control rod 12 is also changed to a hollow tube to permit coolant flow into tool lock collet area occupied by retention collet 10.

SURFACE SENSE ADAPTER

Referring now to FIG. 5 I show a section through a telescoping tool adapter 9 arranged for drilling. The adapter comprises an adapter body 43 and retention knob 14. Slidably supported in body 43 is tool holder 49 driven by key 53 and retained by stop block 47 against pressure from spring 45. Tool actuating rod 44 is secured to tool holder 49 by tool holder plug 46. A drill 52 is clamped in collet 51 by collet lock nut unit 50. Fitting spacer 40 is secured to actuating rod 44 by spacer screw 41.

Before telescoping tool adapter 9 is inserted in spindle 8 control rod 12 (FIG. 3) is fully retracted by linear motor (25,26) FIG. 4. After insertion, linear motor (25,26) advances control rod 12 with a reduced current or low force until control rod 12 contacts spacer screw 14 of actuating rod 44 position of transducer (27,28) is processed by computer numerical control 7 to establish a "0" set point and to verify tool presence and type of tool. The type of tool is determined by the relationship of spacer screw 41 to the gage line of the taper of adapter body 43. "0" setting eliminates any inaccuracies due to thermal growth of spindle control rod 12.

During surface sensing drilling operation, the spindle 8 is advanced toward the workpiece until drill 52 contacts the work surface. The spindle or Z axis will continue to advance, which will cause the tool holder 49 to telescope into adapter body 43 compressing spring 45. This motion will also cause tool actuating rod 44 to displace spindle control rod 12 and sliding element 22 (FIG. 3). Sliding element 22 will displace transducer (27,28) FIG. 4. The transducer displacement will cause computer control 7 (FIG. 2 and FIG. 20) to decelerate the Z axis to zero velocity in the distance it takes the end of the tool holder 49 to seat solidly in tool adapter body 43. At this point, the Z axis position is set to zero and will feed the drill 52 into the work to a depth measured from the work surface by the computer numerical control.

If the drill should break before the depth is reached, spring 45 will cause tool holder 49 to unseat in tool body 43, thereby allowing spindle control rod 12 and transducer (27,28) to be displaced. This motion will cause transducer (27,28) to send an error signal to the computer numerical control which will stop the cycle until the problem is corrected.

AUTOMATIC BORING TOOL

I now refer to FIG. 6 which shows a section through an automatic boring tool which consists of operating body 114 and retention knob 14. Operating body 114 is fitted with pivot block 118 to provide a support for pivot sleeve 122 and pivot locking stud 127. Boring bar 125 is guided in pivot block 118 and retained by pivot sleeve 122. Compressible seal 121 excludes debris from pivot block assembly. Preload springs 120 causes boring bar 125 to pivot around sleeve 122 forcing cam bar 117 secured to boring bar 125 against cam slot 131 in linear cam 115. Linear cam 115 is slidably mounted in operating body 114. Tool actuating rod 113 is secured to linear cam 115 and keeps linear cam 115 fully retracted by force from rod spring 112 acting against fitting spacer 111 secured to actuating rod 113 by spacer screw 110. Adjustable cutting tool cartridge 126 is mounted to boring bar 125. The position of cutting tool 126 is usually preset in a tool room environment.

Before the automatic boring tool is inserted in spindle 8, control rod 12 (FIG. 3) is fully retracted by linear motor (25,26) FIG. 4. After insertion linear motor (25,26) advances control rod 12 with a reduced current or low force until control rod 12 contacts spacer screw 110 of actuating rod 113 position of transducer (27,28) is processed by computer numerical control 7 to establish a "0" set point and to verify tool presence and type of tool. The type of tool is determined by the relationship of spacer screw 110 to the gage line of the taper of operating body 114. "0" setting eliminates any inaccuracies due to thermal growth of spindle assembly components relative to length of spindle control rod 12.

During production run of parts the hole being bored is measured by previously described means and an adjustment value is transmitted to the computer numerical control. The spindle control rod 12 is advanced by 1 linear motor (25,26). The amount of the extension is measured by linear transducer (27,28) and is determined by the cam angle of cam slot 131 of linear cam 115, and the "length ratio" of boring bar 125. As spindle control rod 12 is advanced, tool actuating rod 113 and linear cam 115 are advanced the same distance compressing spring 112. The motion of linear cam 115 and cam slot 131 causes cam bar 117 to rotate boring bar 112 about pivot sleeve 122. This rotation moves cutting tool 126 the correct distance necessary to compensate for tool wear. During the adjustment and machining operations preload springs 120 keep a positive load on boring bar 125 so no looseness can be present between boring bar 125, pivot sleeve 122, cam bar 117, linear cam 115 and bore in operating body 114.

In contouring operations linear servo motor (25,26) will advance and retract while headslide 1, FIG. 1 (Z axis) is being advanced. The phase relationship of these motions controlled by computer numerical control 7 determines the configuration of the contoured parts.

FIG. 7 is a section through cam bar 117 showing cam bar 117 having a press fit in boring bar 125 and slidably fit in linear cam 115. Linear cam 115 is fully supported in bored hole of operating body 114.

FIG. 8 is a section through pivot block 118 showing fit of boring bar width 125 in contoured internal shape of pivot block 118. Boring bar 125 pivots about sleeve 122. Shoulder spacer 128 is fitted to eliminate any end play between the internal dimension of pivot block 118 and width of boring bar 125. In normal machining practices, end play may occur, but by fitting spacer 128 and tensioning locking stud 127 by means of washer 130 and locking nuts 129 will cause a slight deflection in pivot block 118, thus eliminating end play. A section through preload springs 120 is also shown.

Referring to FIG. 9, I show a section through a probing device arranged for stylus deflection parallel to the probe center line. The probe device comprises a support body 156 and retention knob 14. Ball spline bushing 147 and shaftstop collar 146 are secured in the bore of support body 156 by cap 148. Stylus 153 is secured to stylus mounting head 154. Center shaft 155 is supported in ball spline bushing 147 by external ground splines. Stylus mounting head 154 is secured to one end of center shaft 155. Tool actuating rods 144 and stop washer 145 are secured to the opposite end. Probe preload spring 143 is guided on actuating rod 144 and determines stylus neutral position by maintaining pressure between stop washer 145 and spring stop 142. Fitting spacer 141 is secured to actuating rod 144 by spacer screw 140. Bellows 150 and guard 151 provide protection to spline shaft 155.

Before any probing device as shown in FIGS. 9, 10, 11, 13 and 15 is inserted in spindle 80 control rod 12, (FIG. 3) is fully retracted by linear motor (25,26) FIG. 4. After insertion linear motor (25,26) advances control rod 12 with a reduced current or low force until control rod 12 contacts spacer screw of the appropriate tool actuating rod, position of transducer (27,28) is processed by computer numerical control 7 to establish a "0" set point and to verify tool presence and type of tool. The type of tool is determined by the relationship of the spacer screw to the gage line of the operating body. "0" setting eliminates any inaccuracies due to thermal growth of spindle assembly components relative to length of spindle control rod 12.

In operation the spindle 8 is advanced toward the workpiece 158 until stylus 153 contacts the work surface. The spindle or Z axis will continue to advance, which will cause the stylus 153, stylus mounting head 154, center shaft 155, and tool actuating rod 144 to move relative to support body 156 and spindle 8. This motion will also cause tool actuating rod 144 to displace spindle control rod 12 and sliding element 22 (FIG. 3). Sliding element 22 will displace transducer (27,28) FIG. 4. The transducer displacement will cause computer numerical control 7 (FIG. 2 and FIG. 20) to decelerate the Z axis to zero velocity.

The displacement of transducer (27,28) FIG. 4 and FIG. 20 will signal computer numerical control 7 - FIG. 2 and FIG. 20 the probe stylus 153 has contacted work surface 158. The CNC may use this signal in any of the following ways.

Since the transducer (27,28) is in a null or zero position prior to the probing cycle, the initial contact of stylus 153 against work surface 158 will put the transducer in an out of null condition. This signal triggers the probe compatible circuits in the CNC which are designed to use the signal for axis position location. In this mode the spindle axis will overshoot and reverse sits direction at a lower feed rate and again signal a null condition as stylus 153 leaves work surface 158. This final null signal is used to establish axis position. Previous calibrations will then be used to calculate actual work surface location.

An alternate method is to have the CNC 7 decelerate the axis motion in a fixed distance by using the transducer signal to control the axis feed rate during deceleration until that fixed distance is reached. The transducer position is then algebraically added to the axis position to determine work surface location.

Another alternate method is to let normal deceleration occur after probe contact until zero velocity is reached. The transducer position is algebraically added to axis position to determine work surface location.

Referring now to FIG. 10, I show probing device arranged for stylus deflection in both the plus and minus directions parallel to the probe center line. The probe device comprises a support body 164 and retention knob 14. Ball spline bushing 147 is secured in bore of support body 164 by cap 148. Stylus 173 is secured to stylus mounting head 180. Center shaft 174 is supported in ball spline bushing 147 by external ground splines. Stylus mounting head 179 is secured to one end of center shaft 155, tool actuating rod 163 and stop washer 145 are secured to the opposite end. Upper locating spring 162 and lower locating spring 175 are guided on tool actuating rod 163. Outer center bushing 178 is clamped in support body 164 by clamp sleeve 168 and clamp nut 176. Inner center bushing 177 is pinned actuating rod 163 by pin 166. Upper locating spring 162 is retained between upper sliding spring collar 165 and fitting spacer 161 by spacer screw 160. The lower locating spring 175 is contained by lower sliding spring collar 167 and stop washer 145. When stylus 173 is in a neutral position, i.e. when stylus 173 is not in contact with any work surface, the upper spring 162 whose compressive force is contained between spacer screw 160 and pinned inner bushing 177 provides a positive location for stylus 173 in the minus direction by sliding collar 165 acting against outer bushing 178. The lower spring 175 whose compressive force is contained between center shaft 175 and pinned inner bushing 177 provides a positive location for stylus 173 in the plus direction by sliding collar 167 acting against clamped outer bushing 178. Inner bushing 177 and outer bushing 178 are equal lengths.

The upper locating spring 162 is preloaded sufficiently so that no deflection of spring 162 will occur during the "0" set tool preset and verification sequence of spindle control rod 12.

In operation spindle 8 is advanced toward the workpiece until stylus face 171 of stylus 173 contacts work surface 170. The spindle or Z axis will continue to advance, which will cause the stylus 173, stylus mounting head 179, center shaft 174 and tool actuating rod 163 to move relative to support body 156 and spindle 8. This motion will also cause tool actuating rod 163 to displace spindle control rod 12 and sliding element 22 (FIG. 3). Sliding element 22 will displace transducer (27,28) FIG. 4. The transducer displacement will cause computer numerical control 7 (FIG. 2 and FIG. 20) to decelerate the Z axis to zero velocity and process the transducer displacement information for determining the location of the work surface as previously described for the probe in FIG. 9. When the spindle is retracted in a probing cycle established to locate the under side of a workpiece, stylus face 176 will contact work surface 169 again causing components related to transducer position to be displaced thereby causing signals to occur that determine work surface location.

Referring now to FIG. 11, I show a probing device arranged for stylus deflection perpendicular to the probe centerline. The probe device comprises a support body 193 and retention knob 14. Ball spline bushing 147 is secured to support body 193 by cap 195. Upper parallel plate 196, plate spacer 197 and lower parallel plate 199 are secured to and located by cap 195. Stylus 204 is secured to stylus mounting head 209. Stylus mounting head 209 is supported between upper parallel plate 196 and lower plate 199 by ball bearings 211 retained in spacer ring 210. Orientation retention ring 206 has upper keys that operate in slot 207 of stylus mounting head 209 and lower keys that operate in slot 205 of lower parallel plate 199. This assembly permits mounting head 209 to move freely in a plane perpendicular to the probe center line, but is prevented from rotating about the probe center line. Bellow 201 secured to mounting head 209 by clamp 202 and cover 200 is secured to lower parallel plate 199. Center shaft 155 is supported in ball spline bushing 147 by external ground splines. Tool actuating rod 213 and stop washer 192 are secured to center shaft 155. Probe preload spring 194 is guided on actuating rod 213 and is retained between stop washer 192 and spring stop 142. Fitting spacer 191 is secured to actuating rod 213 by spacer screw 190.

In FIG. 14 I show an enlarged section of a 90 degree tapered hole or cam 215 in mounting head 209. Precision ball 214 operates in cam 215, and cam 216 of center shaft plug 217. Pressure from preload spring 194 against cam 232, ball 214 and cam 216 maintains stylus mounting in a neutral position in a plane perpendicular to the probe center line and also in a plane parallel to the probe center line by seating stylus mounting head 230 solidly in tape 233 of disc 220.

In operation the spindle is traversed toward work surface 226 for locating a surface perpendicular to the probe center line. When stylus 224 contacts work surface 226 the stylus mounting head 230 is displaced from its neutral position causing center shaft 155 to be displaced axially by ball 214.

In another operating mode the spindle is traversed toward the work surface 225 in a direction perpendicular to the probe center line for locating a surface parallel to the center line. When stylus 224 contacts work surface 225, disc 220 is immediately displaced from its neutral position by pressure from stylus mounting head 230 through steep taper 233. The displacement will cause cam 232 in stylus mounting head 230 to displace center shaft 155 axially an amount equal to the displacement of stylus 224 by ball 214 rolling on ramp of cam 232 in probe mounting head 230 and cam 216 in center shaft plug 217.

The axial displacement of center shaft 155 from deflection of stylus 224 in a direction parallel or perpendicular to the probe center line will also move tool actuating rod 213 relative to support body 193 and spindle 8. This motion will also cause tool actuating rod 213 to displace spindle control rod 12 and sliding element 22 (FIG. 3). Sliding element 22 will displace transducer (27,28) FIG. 4. The transducer displacement will cause computer numerical control 7 (FIG. 2 and FIG. 20) to decelerate the axis motion to zero velocity and process the transducer displacement information for determining the location of the work surface as previously described for the probe in FIG. 9.

Referring now to FIG. 15, I show a probe device arranged for stylus deflection perpendicular and parallel to the probe center line in both the plus and minus directions. The probe device comprises a support body 193 and retention knob 14. Ball spline bushing 147 is secured plate 196, plate spacer 197 and lower parallel plate 199 are secured to and located by end cap 195.

Disc 245 is supported between upper parallel plate 196 and lower parallel plate 199 by ball bearings 211 retained in spacer ring 210. Orientation retention ring 206 has upper keys that operate in slot 254 of disc 245 and lower keys that operate in slot 256 of lower plate 199. This assembly permits disc 245 to move freely in a plane perpendicular to the probe center line but is prevented from rotating about the probe center line. Stylus 252 is secured to stylus mounting head 253 which is prevented from rotating by pin 243 operating in slot 244 of disc 245. Stylus mounting head 253 is located radially in disc 245 by a precision fit between the mounting inside diameter of disc 245 and the outside diameter of stylus mounting head 253. Stylus mounting head 253 is located axially by means of lower locating spring 260 FIG. 22 compressed between the shoulder of mounting head 253 and sliding collar 257 and contained by sleeve 259 fastened to mounting head 253 by pin 252. Sliding collar 257 actually determines axial location in a neutral position by being seated against shoulder 263 of disc 245. Bellows 241 is clamped to disc 245 by clamp 242, bellows cover 240 and bellows 241 are secured to lower mounting parallel mounting plate 199 by screw 208 center shaft 155 is supported in ball spline bushing 147 by external ground spline. Tool actuating rod 213 and stop washer 192 are secured to center shaft 155. Probe preload spring 194 is guided on actuating rod 213 and is retained between stop washer 192 and spring stop 142. Fitting spacer 191 is secured by actuating rod 213 by spacer screw 194. In FIG. 16 I show an enlarged section of a 90 degree tapered hole or cam 255 in stylus mounting head 253. Precision ball 214 operates in cam 255 and cam 216 of center shaft plug 217. Pressure from preload spring 194 through center shaft 155, ball 214 and mounting head 253 maintains sliding collar 257 against shoulder 263. The compressed load in lower locating spring 260 is greater than the preload force of spring 194. Therefore no additional deflection occurs in locating spring 260 when in the neutral position. Stylus mounting head 253 and disc 245 are retained in a neutral position in a plane perpendicular to the center line by pressure on precision ball 214 operation cam 255 of stylus mounting head 253 and cam 216 of center shaft plug 217 from spring 194.

In operation the spindle is traversed toward work surface 248 for locating a surface perpendicular to the probe center line in a minus direction. When surface 251 of stylus 252 contacts work surface 246 the stylus mounting head 252 is displaced from its neutral position causing lower locating spring 260 to be compressed. This motion causes preload spring to displace center shaft 155 axially in a minus direction.

In another operating mode the spindle is traversed toward the work surface 247 in a direction perpendicular to the probe center line for locating a surface parallel to the center line. When surface 250 of stylus 252 contacts work surface 247 disc 220 is immediately displaced from its neutral position by pressure from stylus mounting head 252. The displacement will cause cam 255 in stylus mounting head 252 to displace center shaft 155 axially by an amount equal to the displacement of stylus 252 by ball 214 rolling on ramp of cam 255 in probe mounting head 253 and cam 216 in center shaft plug 217.

The axial displacement of center shaft 155 from deflection of stylus 252 in a direction perpendicular to the probe center line or parallel to the probe center line in both the plus and minus directions will also move tool actuating rod 213 relative to support body 193 and spindle 8. This motion will also cause tool actuating rod 213 to displace spindle control rod 12 and sliding element 22 (FIG. 3). Sliding element 22 will displace transducer (27,28) FIG. 4. The transducer displacement will cause computer numerical control 7 (FIG. 2 and FIG. 20) to decelerate the axis motion to zero velocity and process the transducer displacement information for determining the location of the work surface as previously described for the probe in FIG. 9.

Referring to FIG. 17, I show in detail the probe head orientation retention assembly consisting of orientation retention ring 206 having upper keys 261 engaged in slot 254 of disc 245 (FIG. 15) and lower keys 262 engaged in slot 256 of lower parallel plate 199.

Referring now to FIG. 19 and FIG. 20, I show a mechanical schematic comprising headstock 1 with spindle 8 arranged to retain taper 285 of typical tooling device 9 having a tool actuating rod 13. Spindle control rod 12 is rotably connected to sliding element 22 by bearings in housing 19. Sliding element 22 is slidably supported in base 23. Fixed to base 23 is encoder or transducer 27 which works in conjunction with sliding scale 28 mounted to sliding element 22 to provide position location information of sliding element 22 to CNC control 7. Also fixed to base 23 is coil assembly 25 of linear servo motor which works in conjunction with permanent magnet assembly 26 fastened to sliding element 22. Computer numerical control 7 determines the direction and amount of force generated by linear servo motor (25,26). The force on linear motor (25,26) can be controlled to low levels for use in the tool verification and presence cycle, set zero sequence, surface sensing with tool adapters, and probing devices. Higher forces from linear motor (25,26) are applied for milling adapter reset, automatic boring tool operations for precision boring and contouring. The linear transducer (27,28) tracks sliding element location on all low force application and communicates position of sliding element 22 for all these applications to computer numerical control 7. Linear transducer (27,28) also provides feedback information to computer numerical control 7 during closed loop operation when linear motor (25,26) is operating in high force applications. Limit switches 290 are used for safety overtravel purposes.

The detail functions of the above elements are described in the prior descriptions of these basic tooling devices described in this invention i.e.—surface sensing adapter, automatic boring tool and multi-probing devices.

Having thus described my invention, what I claim as new and useful and desire to secure by U.S. Letters Patent is:

1. In a computer numerically controlled machining center having a spindle, a control rod passing through said spindle, a sliding element, said control rod coupled to said sliding element, a linear motor and transducer connected to said sliding element to control the position and force on said sliding element, a tooling device secured in said spindle, a tool actuating rod operable in said tooling device, the position of said tool actuating rod set relative to said tooling device prior to insertion in said spindle, the position is determined by the type of said tooling device in said spindle, the method of establishing tool presence and type of tooling device by advancing said control rod through said linear motor and sliding element with a controlled force until said spindle control rod stalls against said tool actuating rod and said transducer signals position of said tool actuating rod to said computer numerical control.

2. The method described in claim 1 whereby said computer numerical control establishes actual position of the transducer after said spindle control rod stalls against said tool actuating rod to measure motion of said actuating rod during operation of said tooling device thereby eliminating any error due to thermal growth of said spindle or said spindle control rod.

3. The method described in claim 2 whereby said spindle control rod acting on said tool actuating rod by means of said linear motor and transducer controls the function of said tooling device during operations.

4. The method described in claim 1 wherein the tool presence is established and type of tooling for eliminating error due to thermal growth and for determining work surface location for random length tools.

5. The method described in claim 1 wherein the tool presence is established and type of tooling for eliminating error due to thermal growth and for sensing tool condition.

6. The method described in claim 1 wherein the tool presence is established and type of tooling for eliminating error due to thermal growth for use in tools of the class ordinarily used in machine tool machining centers.

* * * * *